United States Patent [19]
Reidenbach

[11] Patent Number: 5,283,704
[45] Date of Patent: Feb. 1, 1994

[54] ROTARY ACTUATOR FOR DISK DRIVE ASSEMBLIES

[75] Inventor: John R. Reidenbach, Rochester, Minn.

[73] Assignee: International Business Machines Corporation, Armonk, N.Y.

[21] Appl. No.: 18,464

[22] Filed: Feb. 16, 1993

Related U.S. Application Data

[63] Continuation of Ser. No. 636,330, Dec. 31, 1990, abandoned.

[51] Int. Cl.$^5$ .............................................. G11B 5/48
[52] U.S. Cl. ................................. 360/104; 360/97.01
[58] Field of Search .................. 360/97.01, 104, 103, 360/105

[56] References Cited

U.S. PATENT DOCUMENTS

| | | | |
|---|---|---|---|
| 4,884,261 | 11/1989 | Dalziel | 360/97.01 X |
| 5,005,095 | 4/1991 | Wagner | 360/97.01 X |
| 5,012,369 | 4/1991 | Owe et al. | 360/104 |
| 5,027,240 | 6/1991 | Zarouri et al. | 360/104 |

FOREIGN PATENT DOCUMENTS

| | | |
|---|---|---|
| 0060358 | 9/1982 | European Pat. Off. |
| 0248650 | 12/1987 | European Pat. Off. |
| 2840500 | 4/1979 | Fed. Rep. of Germany |
| 0157017 | 10/1985 | Fed. Rep. of Germany |
| 3704436 | 8/1987 | Fed. Rep. of Germany |
| 8702497 | 4/1987 | World Int. Prop. O. |

OTHER PUBLICATIONS

Patent Abstracts of Japan, vol. 12, No. 138 (P-695) (2985) 27 Apr. 1988.

*Primary Examiner*—John H. Wolff
*Attorney, Agent, or Firm*—Mason, Kolehmainen, Rathburn & Wyss

[57] ABSTRACT

A rotary actuator utilized to read and/or write data on disks includes an integral, one piece support member for carrying a transducer head along a path over the surface of a disk in a disk drive assembly. The member is directly mounted for pivotal movement.

5 Claims, 3 Drawing Sheets

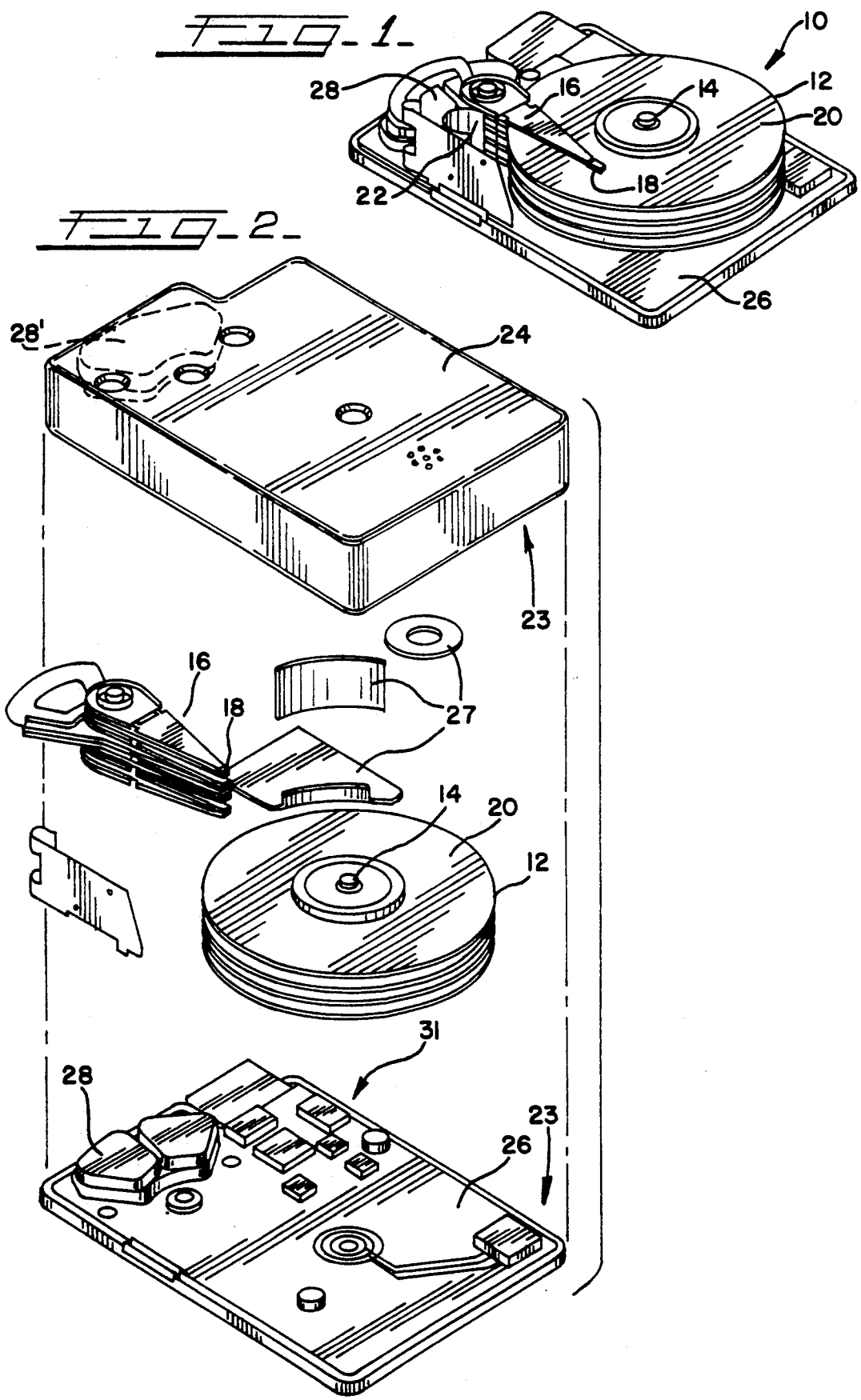

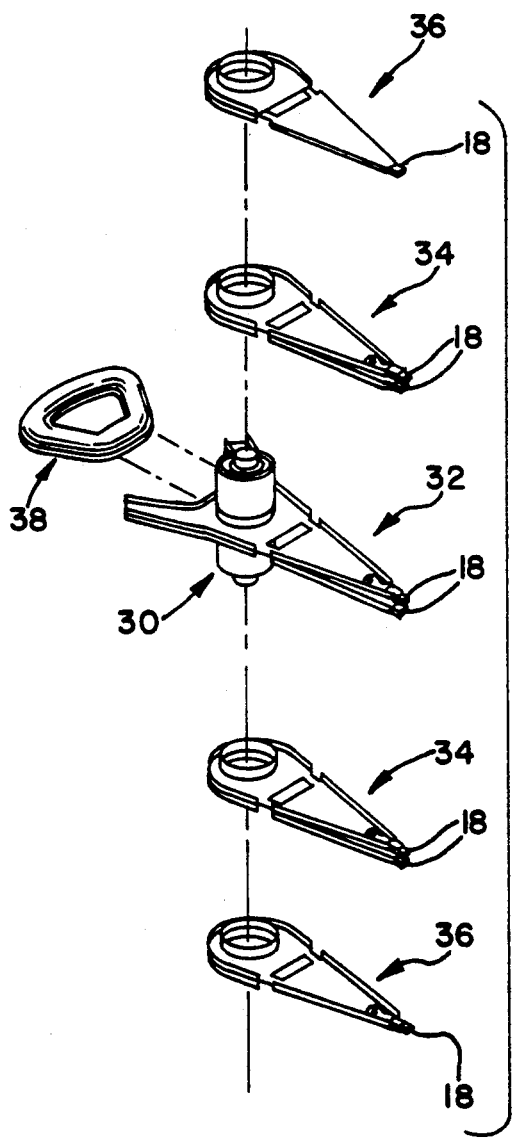
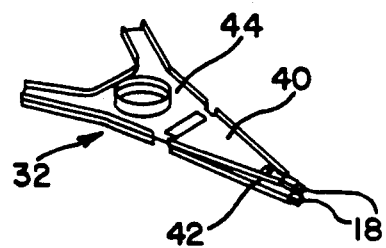
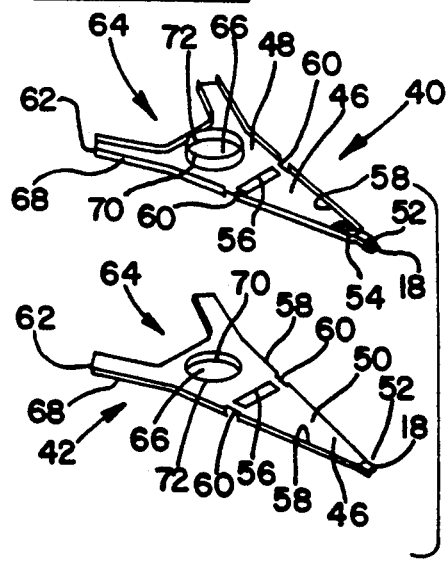

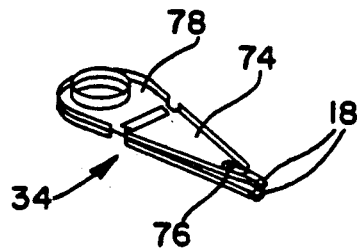
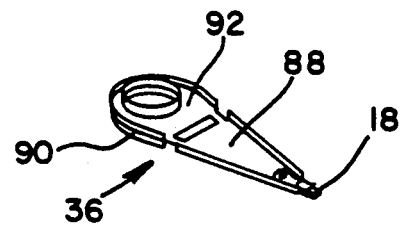
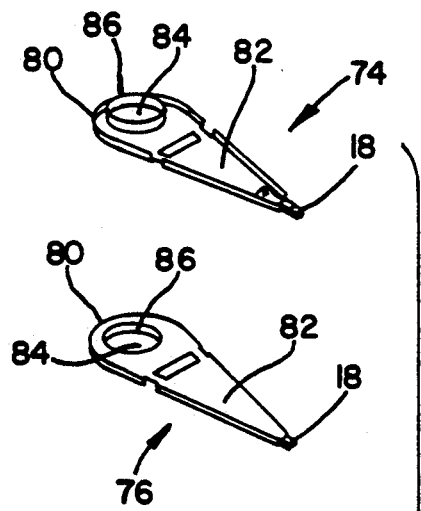
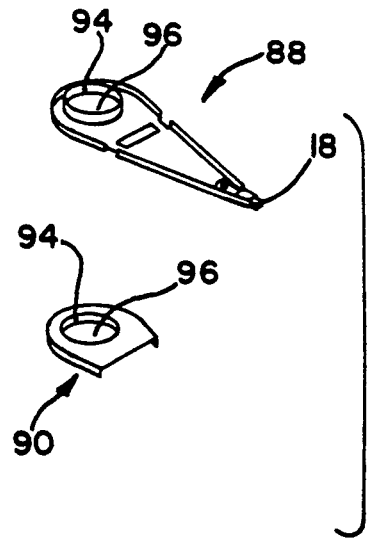

ROTARY ACTUATOR FOR DISK DRIVE ASSEMBLIES

This application is a continuation of application Ser. No. 07/636,330, filed Dec. 31, 1990, now abandoned.

BACKGROUND OF THE INVENTION

1. Field of the Invention

The present invention relates to rotary actuators for a computer disk drive assembly and, more particularly, to rotary actuators that position a read and/or write head relative to computer data storage disks.

2. Background of the Prior Art

A disk drive assembly provides memory storage for a computer system. Primary components of the assembly are memory storage disks that store digital data, transducer heads that write data upon or retrieve data from the disks, and a rotary actuator that positions the heads relative to the disk surfaces.

Prior art rotary actuators utilize a pivotable support member and a comb assembly. The support member and comb assembly generally includes several rigid arms which are closely spaced and look like a comb. Attached to each of these rigid arms is at least one head suspension assembly. The head suspension assembly includes a load beam, a flexure and a transducer head. At least one load beam is attached to each of the rigid arms of the support member and comb assembly. Attached to the load beam is a gimbal or flexure. The transducer head is attached to the flexure. The load beam is bent to form a spring hinge to bias the transducer head toward the disk. The flexure or gimbal allows the transducer head to comply to the surface of a disk over which the transducer head is passed.

The dimensions of the comb assembly are dictated by the disk diameter and disk to disk spacing within the disk drive. The disks used in the prior art have been relatively large in diameter, for example, three and one-half inches and larger. However, disk diameters are continually becoming smaller. In some computer systems, disk diameters have been reduced to less than 3 ½ inches. In addition, the disk to disk space is decreasing. When utilizing disks having diameters with smaller dimensions, the space available for a comb with discrete support arms is shrinking. The length of the arms of the actuator are also shrinking as the disk diameter drops. A comb for a small size drive is expensive and delicate. Existing support arms may not fit.

SUMMARY OF THE INVENTION

It is an object of the present invention to overcome many of the disadvantages associated with rotary actuators having discrete combs and arms that position transducer heads adjacent to data storage disks. Other objects are to avoid the necessity for both a comb and separate head suspension assemblies; to simplify a rotary actuator that moves a read and/or write head relative to a disk surface; to reduce costs associated with a rotary actuator; to provide a rotary actuator well suited to small size disk drive assemblies; to provide a unitary and one piece support member that supports a read and/or write head, and mounts to a pivotable support member.

In accordance with the present invention, many of the disadvantages of prior art rotary actuators, as discussed above, have been overcome. The actuator of the present invention employs a support member for carrying a head along a path over the surface of a disk in a disk drive assembly. The support member includes a unitary and one piece element having a head supporting portion at one end of the element and having a mounting hub portion at a region spaced from the head supporting portion.

In a multiple disk system, further disadvantages of the prior art rotary actuators have been overcome. For multiple disks, the actuator of the present invention employs a support assembly for carrying a pair of oppositely facing heads along paths between an interfacing pair of disk surfaces in a disk drive system. The assembly includes a pair of similar unitary and one piece support elements each having a head supporting portion at one end of the element and having a mounting hub portion at a region spaced from the head supporting portion. The elements are aligned with one another and attached to one another.

As used throughout this description and in the appended claims, the phrase "unitary and one piece" is intended to exclude an assembly including separate, discrete parts that have been attached together.

BRIEF DESCRIPTION OF THE DRAWINGS

These and other objects, advantages and novel features of the present invention, as well as details of an illustrative embodiment thereof, will be more fully understood from the following detailed description and attached drawings, wherein:

FIG. 1 is a perspective view of a disk drive assembly in accordance with the present invention with the cover removed;

FIG. 2 is an exploded perspective view of the disk drive assembly shown in FIG. 1.

FIG. 3 is an exploded perspective view of the rotary actuator of the disk drive assembly;

FIG. 4 is a perspective view of a drive support assembly in accordance with the present invention;

FIG. 5 is a perspective view of the drive support assembly of FIG. 4 separated into two, one piece support beams;

FIG. 6 is a perspective view of an inner head support assembly in accordance with the present invention;

FIG. 7 is a perspective view of the inner head support assembly of FIG. 6 separated into two, one piece support beams;

FIG. 8 is a perspective view of an outer head support assembly in accordance with the present invention; and FIG. 9 is a perspective view of the outer head support assembly of FIG. 8 separated into a one piece support beam and a one piece support hub.

DETAILED DESCRIPTION OF THE PREFERRED EMBODIMENT

Referring to the drawings, and first to FIG. 1, reference numeral 10 denotes a disk drive assembly with the cover removed for clarity. The disk drive assembly 10 includes multiple interfacing disks 12 stacked upon a spindle 14, a rotary actuator 16 that positions multiple read and/or write transducer heads 18 adjacent to corresponding disk surfaces 20, and a flexible circuit 22 that carries electrical signals to and from the rotary actuator 16.

Referring to FIG. 2, an exploded view of the disk drive assembly 10 of FIG. 1 is shown. The drive assembly 10 includes an enclosure 23 having a cover 24, and a base plate 26. Filters 27 are carried within cover 24. Magnet assemblies 28 and 28' are secured to the base plate 26 and cover 24, respectively, and form part of a voice coil motor for pivoting the rotary actuator 16 and heads 18.

Referring to FIG. 3, an exploded view of the rotary actuator is shown. The rotary actuator 16 includes a bearing cartridge 30, a support assembly 32, two inner head support assemblies 34, two outer head support assemblies 36 and a motor coil 38 secured to the central support assembly 32. The support assemblies 32, 34 and 36 are secured to the bearing cartridge 30 with all the transducer heads 18 aligned. The bearing cartridge 30 is captured between base plate 26 and cover 24, and provides a pivotable support that allows the support assemblies 32, 34 and 36 to pivot in unison to position the heads 18 along a path adjacent to the disks 12.

The disks 12 include opposed surfaces onto which the heads 18 can write data and from which the heads 18 can read data. In the illustrated assembly 10, the data read-write system is magnetic and used in a disk drive. It should be noted that the invention can be adapted for use in other systems such as linear actuators, optical systems and other systems other than disk drives.

The motor coil 38 conducts an electrical current of varying intensity that is controlled by electronics 31 carried by the base 26 and coupled to the actuator 16 by the flexible circuit 22. A data processing system used with the assembly 10 is coupled to the assembly 10 and provides control signals through a suitable channel or bus and interfaces or adapters. The motor coil 38 works in conjunction with the magnet assemblies 28 and 28' of the voice coil motor to pivot the support assemblies 32, 34 and 36 in unison around the bearing cartridge 30 to predetermined positions aligned with data tracks and segments on the surfaces of disks 12.

Referring to FIG. 4, the central support assembly 32 is shown. The central support assembly 32 includes a first unitary and one piece support beam or member 40 and an identical second unitary and one piece support beam 42 aligned and joined together at a hub portion 44. The end portions of the support beams 40 and 42 that support the heads 18, diverge slightly to position the heads 18 closer to interfacing disk surfaces 20.

Referring to FIG. 5, the support beams 40 and 42 of FIG. 4 are shown separated. Each support beam 40 and 42 is made by stamping and forming a single piece of thin, flexible sheet metal stock, and includes a V-shaped one piece base 46 having a first planar surface 48 and an opposing second planar surface 50. Each base 46 has a pointed first end 52. A transducer head 18 is attached to each first planar surface 48 by a head retainer or flexure 54.

A slot 56 is formed near the lateral midsection of each base 46 such that the longitudinal axis of the slot 56 is perpendicular to the longitudinal midline of the base 46. Each base 46 includes two longitudinal edges 58 that converge to form the pointed first end 52 thereby providing the V configuration to the base 46. The edges 58 include small recesses 60 that are positioned adjacent to the lateral sides of the slot 56. The slot 56 and recesses 60 form a base midsection of two narrow strips of sheet metal that act as a spring hinge to allow each base 46 to diverge from the slot 56 to the pointed first end 52. The spring hinges defined by slots 56 provide for loading between the head and the disk and permit the heads 18 to move slightly toward and away from disks 12 while preventing movement in the other two orthogonal directions. The single axis movements permit the heads 18 to fly when disks 12 spin and to land when disks 12 are stopped.

Each base 46 includes a second end 62 having a trapezoidal-shaped recess 64 therein. A hub aperture 66 is located in each base 46 between the slot 56 and the trapezoidal-shaped recess 64. The longitudinal edges 58 of the base 46 diverge slightly at points that form a line through or near the center of the aperture 66 and perpendicular with the longitudinal midline of the base 46. These offsets make the edges 58 diverge more at the second end 62 of the base 46 to enlarge the recess 64 and allow the motor coil 38 to be inserted therein.

A stiffening flange 68 is formed perpendicular to the periphery of the first planar surface 48 of each base 46 to provide rigidity in the base 46. The flange 58 discontinues at the recesses 60 to retain the hinge function. A mounting flange 70 is perpendicular to the first planar surface 48 of each base 46 at the edge 72 of the aperture 66 forms a mounting hub that receives the bearing cartridge 30. The members or beams 40 and 42 are aligned and attached together and mounting flanges 70 are secured to the bearing cartridge 30 by laser spot welding, or other means.

Referring to FIG. 6, an inner head support assembly 34 is shown. The inner head support assembly 34 is similar in many respects to the central support assembly 32. Support assembly 34 includes a first unitary and one piece support beam 74 and a second unitary and one piece support beam 76 aligned and joined at a hub portion 78. The end portions of the support beams 74 and 76 that support the heads 18, diverge slightly to position the heads 18 closer to interfacing disk surfaces 20.

Referring to FIG. 7, the support beams 74 and 76 of FIG. 6 are shown separated. From FIGS. 5 and 7, it is apparent that the only difference between the assemblies 32 and 34 is the shape of the second end 80 of the bases 82. Instead of a trapezoidal-shaped recess 64, a circular second end 80 concentric with the aperture 84 is shown. Since only one motor coil 38 is required, this simpler shape is used. In other respects, beams 74 and 76 are like beams 40 and 42. A mounting flange 86, together with the aperture 84, forms a hub that receives the bearing cartridge 30 therein.

Referring to FIG. 8, an outer head support assembly 36 is shown. The outer head support assembly 36 is similar in many respects to the inner head support assembly 34. Support assembly 36 includes a first unitary and one piece support beam 88 and a second unitary and one piece support hub 90 aligned and joined at a hub portion 92. The end portion of support beam 88 that supports the head 18, is angled slightly to position the head 18 close to a disk surface 20.

Referring to FIG. 9, the support beam 88 and support hub 90 of FIG. 8 are shown separated. From FIG. 9, it is apparent that the difference between the assemblies 34 and 36 is that because only a single head 18 is employed, the support hub 90 is used in place of a second head support beam. A mounting flange 94 and an aperture 96 are included to form a hub that receives the bearing cartridge 30 therein.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A disk drive assembly comprising in combination:
   an enclosure;

a spindle;

at least two disks in a stack rotatably mounted on said spindle and having at least one pair of interfacing, spaced apart disk surfaces;

a rotatory actuator including at least two transducer heads adapted to fly over said disk surfaces for reading and writing data on said pair of interfacing, spaced apart disk surfaces;

said rotary actuator including pivot means for pivotally mounting said rotary actuator and at least one support assembly for holding two of said transducer heads between said pair of interfacing, spaced apart disk surfaces;

motor means for pivoting said rotary actuator in order to move said transducer heads across said disk surfaces;

said disk drive assembly being characterized by:

said support assembly including two integral and one piece beams each having front and back surfaces, a pivot mount structure and an end portion including a head mount region spaced from said pivot mount structure;

said beams each including means defining a flexible and resilient hinge region between said head mount region and said pivot mount structure;

one of said transducer heads being mounted at said head mount region of each of said beams; and said beams being mounted with said back surfaces facing one another, with said pivot mount structures in engagement with said pivot means and with said end portions spaced apart to permit independent flexing movement of said transducer heads;

each of said beams comprising a stamped and formed sheet metal body, said hinge region defining means including an aperture in said body, an upstanding stiffening flange along the periphery of said body, and a gap in said flange adjacent said hinge region.

2. A transducer head support for a disk drive assembly rotary actuator comprising:

an integral and one piece stamped and formed generally flat sheet metal body;

an opening in said body for receiving a pivot support;

an end portion spaced from said opening for receiving a transducer head;

an upstanding stiffening flange defined at the periphery of said body;

an aperture in said body between said opening and said end portion defining a plurality of narrow strips forming a flexible, resilient hinge; and a gap in said flange aligned with said aperture.

3. A transducer head support as claimed in claim 2 further comprising a second upstanding flange surrounding said opening and defining a pivot hub.

4. A transducer head support as claimed in claim 3, said upstanding flanges extending from the plane of said body in the same direction.

5. A transducer head support as claimed in claim 2, said body including a support portion extending from said opening and away from said end portion and having structure adapted to mount a drive motor component.

* * * * *